US009313713B2

(12) United States Patent
Hussain

(10) Patent No.: US 9,313,713 B2
(45) Date of Patent: Apr. 12, 2016

(54) METHOD FOR DISCOVERING A PLURALITY OF NFC-B DEVICES BY A NFC-B READER AND CORRESPONDING NFC-B READER

(71) Applicant: STMicroelectronics International N.V.—Netherlands, Amsterdam (NL)

(72) Inventor: Jafer Hussain, Singapore (SG)

(73) Assignee: STMicroelectronics International N.V., Amsterdam (NL)

( * ) Notice: Subject to any disclaimer, the term of this patent is extended or adjusted under 35 U.S.C. 154(b) by 0 days.

(21) Appl. No.: 14/706,079

(22) Filed: May 7, 2015

(65) Prior Publication Data

US 2015/0327151 A1 Nov. 12, 2015

(30) Foreign Application Priority Data

May 7, 2014 (FR) ..................................... 14 54112

(51) Int. Cl.
| | | |
|---|---|---|
| *H04B 5/00* | (2006.01) | |
| *H04W 40/24* | (2009.01) | |
| *H04W 52/02* | (2009.01) | |
| *G06K 7/10* | (2006.01) | |
| *H04W 74/08* | (2009.01) | |
| *H04W 8/00* | (2009.01) | |
| *H04W 4/00* | (2009.01) | |
| *H04W 84/18* | (2009.01) | |

(52) U.S. Cl.
CPC ......... *H04W 40/246* (2013.01); *G06K 7/10029* (2013.01); *H04B 5/0031* (2013.01); *H04B 5/0056* (2013.01); *H04W 8/005* (2013.01); *H04W 52/0216* (2013.01); *H04W 74/085* (2013.01); *H04W 4/008* (2013.01); *H04W 84/18* (2013.01); *Y02B 60/50* (2013.01)

(58) Field of Classification Search
CPC ....................................................... H04W 4/008
USPC ........................................ 455/41.1, 41.2, 41.3
See application file for complete search history.

(56) References Cited

U.S. PATENT DOCUMENTS

2013/0203351 A1 8/2013 Hillan et al.

OTHER PUBLICATIONS

Rieback, et al., "A Platform for RFID Security and Privacy Administration," 20th Large Installation System Administration Conference (LISA '06), downloaded by EPO on Apr. 11, 2013, 14 pages.
NFC Forum, "NFC Digital Protocol: Technical Specification," NFC Forum Digital 1.0, NFCForum-TS-DigitalProtocol-1.0, Nov. 17, 2010, 194 pages.
NFC Forum, "NFC Activity Specification: Technical Specification," NFC Forum Activity 1.0, NFCForum-TS-Activity-1.0, Nov. 18, 2010, 117 pages.

*Primary Examiner* — Hsin-Chun Liao
(74) *Attorney, Agent, or Firm* — Slater & Matsil, L.L.P.

(57) ABSTRACT

A discovered NFC-B listen mode device is put to SLEEP state only when there are one or more NFC-B listen mode devices yet to be discovered. An optimal value for the number of time slots indicated in a command is computed based on a combination of whether an empty time slot was detected and/or collision was detected and/or an NFC-B listen mode device was discovered in a discovery cycle. The compliance with the NFC Forum Activity Specification allows the direct activation of an NFC-B listen mode device, and thus speeds up the data transfer phase and consumes much less power.

19 Claims, 6 Drawing Sheets

FIG.5

| | Initial "N=1" → No. of time slots (NoS)=$2^{(N-1)}$ =$2^{(1-1)}$ =$2^0$ =1 | | | | |
|---|---|---|---|---|---|
| Discovery Cycle # 01 | SENSB_REQ Command NoS=1 | Slot # 01 ✗ D1, D2, D3 & D4 | | | |
| | Increment "N to 2" → No. of time slots (NoS)=$2^{(N-1)}$ =$2^{(2-1)}$=$2^1$ =2 | | | | |
| Discovery Cycle # 02 | SENSB_REQ Command NoS=2 | Slot # 01 ✗ D1 & D2 | SLOT_MARKER Command for Slot # 2 | Slot # 02 ✗ D3 & D4 | |
| | Increment "N to 3" → No. of time slots (NoS)=$2^{(N-1)}$ =$2^{(3-1)}$=$2^2$ =4 | | | | |
| Discovery Cycle # 03 | SENSB_REQ Command NoS=4 | Slot #01 ✓ D1 | SLOT_MARKER Command for Slot # 2 | Slot #02 ✓ D2 | SPLB_REQ Command for D1 |
| Discovery Cycle # 03 | SLOT_MARKER Command for Slot # 3 | Slot #03 ✗ D3 | SLOT_MARKER Command for Slot # 4 | Slot #04 ✦ | SPLB_REQ Command for D2 |
| | No change in the value of "N" | | | | |
| Discovery Cycle # 04 | SENSB_REQ Command NoS=4 | Slot #01 ✦ | SLOT_MARKER Command for Slot # 2 | Slot #02 ✗ D3 & D4 | |
| Discovery Cycle # 04 | SLOT_MARKER Command for Slot # 3 | Slot #03 ✦ | SLOT_MARKER Command for Slot # 4 | Slot #04 ✦ | |
| | No change in the value of "N" | | | | |
| Discovery Cycle # 05 | SENSB_REQ Command NoS=4 | Slot #01 ✦ | SLOT_MARKER Command for Slot # 2 | Slot #02 ✓ D3 | |
| Discovery Cycle # 05 | SLOT_MARKER Command for Slot # 3 | Slot #03 ✓ D4 | SPLB_REQ Command for D3 | SLOT_MARKER Command for Slot # 4 | Slot #04 ✦ |

METHOD FOR DISCOVERING A PLURALITY OF NFC-B DEVICES BY A NFC-B READER AND CORRESPONDING NFC-B READER

This application claims the benefit of French Application No. 1454112, filed on May 7, 2014, which application is hereby incorporated herein by reference.

TECHNICAL FIELD

Embodiments of the invention relate to the communication between components or elements, in particular between a contactless element, for example a NFC ("Near Field Communication") controller element, for example located within a wireless apparatus, such as a mobile phone, operating in a poll mode and at least one device operating in a listen mode.

BACKGROUND

Near Field Communication or NFC is a short range high frequency wireless communication technology which enables such exchange of data between two contactless devices over a short distance, for example 10 centimeters.

NFC is an open platform technology standardized in ISO/IEC 18092 and ISO/IEC 21481 but incorporates a variety of pre-existing standards including ISO/IEC 14443 protocol type A and type B.

Particular embodiments of the invention encompass type-B technology (also known as NFC-B) devices. A NFC-B device can operate in two modes, i.e., Poll mode or Listen mode.

The NFC-B Poll mode device supplies the RF field and transmits a NFC-B poll request (for example a SENSB_REQ command) in order to detect the presence of NFC-B listen mode devices in the RF field.

A NFC-B listen mode device present in the RF field, upon receiving the SENSB_REQ command, transmits its response, for example a SENSB_RES response.

NFC-B listen mode devices may be available in the form of NFC tags/cards that can store different type of data which can be read by an NFC-B Poll mode device or an NFC-B reader, for example an NFC-enabled mobile phone, NFC card/tag reader etc.

Besides, an NFC-enabled mobile phone can also emulate an NFC-B listen mode device or even plurality of NFC-B listen mode devices. NFC tags may be also embedded in cards by different vendors, suppliers and merchants e.g., banks, credit card companies etc. Consumers may carry multiple NFC tags/cards in their wallets.

NFC-B or type-B technology is standardized in ISO14443 and NFC Forum Digital and Activity Specifications, for example the following documents:

NFC Digital Protocol, Technical Specification NFC Forum™, DIGITAL 1.0, NFCForum-TS-DigitalProtocol-1.0, 2010 Nov. 17; and NFC Activity Specification, Technical Specification, NFC Forum™, ACTIVITY 1.0, NFCForum-TS-Activity-1.0, 2010 Nov. 18.

As per the existing technology, an NFC-B Poll mode device turns on the RF field and then transmits the SENSB_REQ command after 5 ms guard-time. One of the parameters in the SENSB_REQ command indicates the number of time slots 'NoS' for receiving the SENSB_RES responses from the NFC-B listen mode devices. Each time slot has a fixed duration during which an NFC-B listen mode device can transmit its SENSB_RES response. The time of the 1st time slot starts after the transmission of the SENSB_REQ command. However, for each subsequent time slot (i.e., '2' to 'NoS'), the NFC-B Poll mode device transmits a SLOT_MARKER command in order to indicate the start time of the respective time slot (i.e., '2' to 'NoS'). It means that the NFC-B Poll mode device transmits a total of NoS−1 SLOT_MARKER commands.

An NFC-B listen mode device randomly selects a time slot in which it transmits its SENSB_RES response. It may happen that plurality of NFC-B listen mode devices transmit their SENSB_RES responses in the same time slot. In such case, it is detected as an invalid SENSB_RES response or collision by the NFC-B Poll mode device. It is the responsibility of the NFC-B Poll mode device to uniquely and individually discover (identify) each of the NFC-B listen mode devices successfully which are present in the RF field.

The NFC Forum Digital and Activity Specifications mentioned above disclose a procedure to discover (identify) a plurality of NFC-B listen mode devices.

Such a discovery or identifying method comprises more than one discovery cycles, also called collision resolution cycles.

An NFC-B Poll mode device must discover all the NFC-B listen mode devices independently so that it can recognize, based on the individual SENSB_RES responses, each NFC-B listen mode device's functionality (e.g., Type of protocol and application supported, value of Unique ID or NFCID0 etc.). The NFC-B Poll mode device can then select the preferred or desired NFC-B listen mode device and initiate data transfer phase.

An NFC-B listen mode device transmits only one SENSB_RES response during a discovery cycle.

This prior art method disclosed in the NFC Forum Activity Specification has multiple drawbacks, as indicated below.

The Activity Specification requires the last discovered NFC-B listen mode device of the last discovery cycle to be in the ACTIVE state, but the discovery process disclosed in the NFC Forum Activity Specification may also put the last discovered NFC-B listen mode device to SLEEP state. This behavior violates the NFC Forum Activity Specification.

Because of the above drawback in the existing solution, it considerably increases the device activation time of the last discovered NFC-B listen mode device which must be woken up from SLEEP first and thus it delays the data transfer phase significantly.

Further, in some other situations, the prior art solution unnecessarily continues to increase the number of time slots in the SENSB_REQ command.

And unnecessarily increasing the number of time slots slows down the discovery process to a large extent unnecessarily, increases the power consumption of the NFC-B reader and delays the data transfer phase significantly.

As a result, it may lead to undiscovered NFC-B listen mode devices because the discovery process will exit once a discovery cycle executes with maximum number of time slots of '16' (i.e., when N=5, and $NoS=2^{(N-1)}=2^{(5-1)}=2^4=16$).

The prior art solution may result in unpredictable behavior which will cause interoperability and compliance issues, and doesn't provide a deterministic discovery procedure to discover plurality of NFC-B listen mode devices.

According to an embodiment, it is proposed a deterministic discovery method for discovering (identifying) a plurality of NFC-B listen mode devices present in the RF field of an NFC-enabled reader, which is also compliant to NFC Forum Activity Specification.

According to an embodiment, it is proposed such a method which consumes much less power as compared to the existing solution as it expedites the method of discovering a plurality of NFC-B listen mode devices.

SUMMARY

It is also proposed, according to an embodiment, to reduce the complexity of hardware and/or software implementation in an NFC Controller, and to provide a method which is flexible and thus can be implemented either in software/firmware or in hardware.

According to an embodiment, a discovered NFC-B listen mode device is put to SLEEP state only when there are one or more NFC-B listen mode devices yet to be discovered. An optimal value for the number of time slots indicated in the SENSB_REQ command is computed based on a combination of whether an empty time slot was detected and/or collision was detected and/or an NFC-B listen mode device was discovered in a discovery cycle. The compliance with the NFC Forum Activity Specification allows the direct activation of an NFC-B listen mode device, and thus speeds up the data transfer phase and consumes much less power.

According to an aspect, it is proposed a method for identifying a plurality of Near Field Communication-type B devices operating in a listen mode, called NFC-B listen mode devices, by a Near Field Communication-type B device operating in a poll mode, called NFC-B poll mode device, during more than one collision resolution cycles, each collision resolution cycle starting with a first command sent by the NFC-B poll mode device and including a number of time slots lower than or equal to a maximum number, the first collision resolution cycle including one time slot.

According to this aspect, when the NFC-B poll mode device is to start another collision resolution cycle after a current collision resolution cycle is ended, the NFC-B poll mode device increases the number of time slots with respect to the number of time slots of the ended current collision resolution cycle if and only if no NFC-B listen mode device has been identified during the ended current collision resolution cycle and no empty time slot has been detected during the ended current collision resolution cycle, and when a NFC-B listen mode device is identified within a time slot of a current collision resolution cycle, the NFC-B poll mode device sends to the identified NFC-B listen mode device, within a subsequent time slot of the current collision resolution cycle except for the NFC-B listen mode device lastly identified within the last collision resolution cycle, a second command for putting the identified NFC-B listen mode device in a sleep state.

Thus, the number of time slots is not unnecessarily increased and the last identified NFC-B listen mode device of the last collision resolution cycle is in an active state which complies with the NFC Forum Activity Specification.

According to an embodiment, within a collision resolution cycle, the NFC-B poll mode device sends the second command to the identified NFC-B listen mode device during the next time slot within which another NFC-B listen mode device is identified or within the last time slot except if the collision resolution cycle is the last collision resolution cycle.

According to an embodiment, a collision resolution cycle is the last collision resolution cycle if no collision between at least two NFC-B listen mode devices has been detected in all the time slots of the collision resolution cycle, or if the number of time slots of the collision resolution cycle is equal to the maximum number.

According to another aspect, it is proposed a Near Field Communication-type B device configured to operate in a poll mode, called NFC-B poll mode device, comprising a NFC controller configured to identify a plurality of Near Field Communication-type B devices operating in a listen mode, called NFC-B listen mode devices, during more than one collision resolution cycle. The controller includes a transmitting block and a receiving block. The transmitting block is configured to transmit, at the beginning of each collision resolution cycle, a first command including a number of time slots lower than or equal to a maximum number, the first collision resolution cycle including one time slot. The receiving block is configured to detect the presence or the absence of any response during a time slot and to analyze such response.

According to this another aspect, when the transmitting block is to send another first command for starting another collision resolution cycle after a current collision resolution cycle is ended, the transmitting block is configured to increase the number of time slots with respect to the number of time slots of the ended current collision resolution cycle if and only if the receiving block has received no response representative of an identified (discovered) NFC-B listen mode device during the ended current collision resolution cycle and has detected no empty time slot during the ended current collision resolution cycle, and when the receiving block has detected a response representative of an identified NFC-B listen mode device within a time slot of a current collision resolution cycle, the transmitting block is configured to send to the identified NFC-B listen mode device, within a subsequent time slot of the current collision resolution cycle except for the NFC-B listen mode device lastly identified within the last collision resolution cycle, a second command for putting the identified NFC-B listen mode device in a sleep state.

According to an embodiment, within a collision resolution cycle, the transmitting block is configured to send the second command to the identified NFC-B listen mode device during the next time slot within which another NFC-B listen mode device is identified or within the last time slot except if the collision resolution cycle is the last collision resolution cycle.

According to an embodiment, the transmitting block is configured to consider a collision resolution cycle as the last collision resolution cycle if the receiving block does not receive any response representative of a collision between at least two NFC-B listen mode devices in all the time slots of the collision resolution cycle, or if the number of time slots of the collision resolution cycle is equal to the maximum number.

The NFC-B poll mode device may be an NFC-B enabled reader device, for example a NFC-enabled mobile phone.

BRIEF DESCRIPTION OF THE DRAWINGS

Other advantages and features of the invention will appear on examining the detailed description of embodiments, these being in no way limiting, and of the appended drawings in which:

FIGS. 1-3, 4a, 4b and 5-7 illustrate diagrammatically embodiments of the invention.

DETAILED DESCRIPTION OF ILLUSTRATIVE EMBODIMENTS

Embodiments of the invention will be now described in the technical field of contactless elements or components, such as a NFC controller, in particular embedded in a mobile phone, communicating together according to the NFC Forum Digital Activity Specifications, for example the specification documents mentioned above, by using a NFC-B protocol, although this invention is not limited to these particular embodiments.

A contactless element is an element or a component able to exchange information through an antenna with a contactless device according to contactless communication protocol.

A NFC element or component, which is a contactless element, is an element or component compliant with the NFC technology.

In particular, the different commands, responses and states mentioned therebelow and their format (for example the SENSB_REQ, SLPB_REQ, SLOT_MARKER commands, the SENSB_RES response, the ACTIVE and SLEEP states) are well known by the man skilled in the art and indicated for example in the NFC Forum Digital and Activity Specifications documents mentioned above. The man skilled in the art may refer to those documents.

Figure 1:
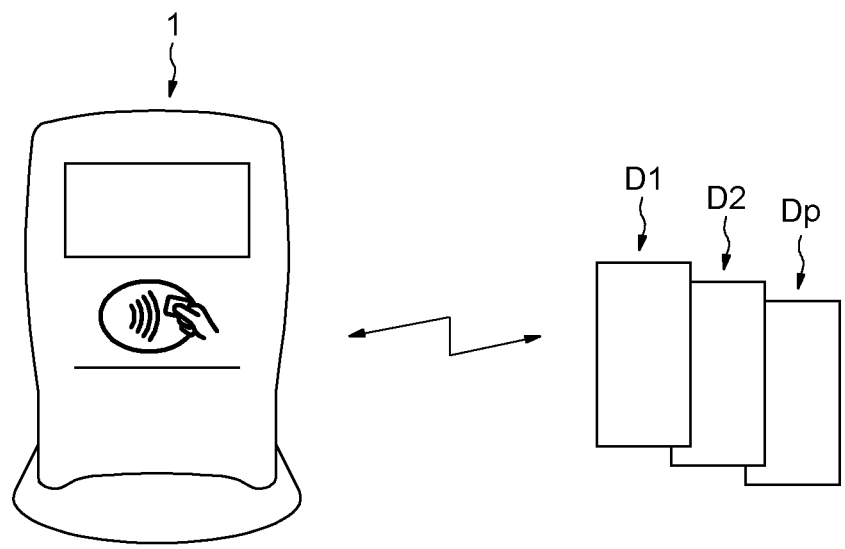

In FIG. 1, a Near Field Communication-type B device 1, for example, a NFC reader, is configured to operate in a poll mode. Such device is also called NFC-B poll mode device.

As indicated in particular in the NFC Digital Protocol Technical Specification, the poll mode is an initial mode of a device when it generates a carrier and probes ("polls") for other devices such as NFC-B listen mode devices D1, D2, ... Dp.

A listen mode, also indicated for example in the NFC Digital Protocol Technical Specification, is an initial mode of a device when it does not generate a carrier. In this mode, the device listens for the RF field of another device, such as the reader 1.

The communication between the reader 1 and the NFC-listen mode devices D1-Dp is a wireless communication, for example a radiofrequency communication. The contactless communication protocol is for example the one disclosed in ISO/IEC 14443.

Figure 2:
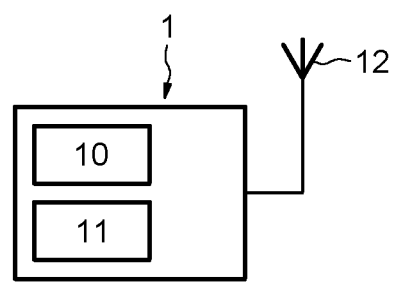

As illustrated diagrammatically in FIG. 2, the NFC-poll mode device 1 comprises a main processor 10 as well as a NFC controller 11 which is responsible for wireless communication, for example RF communication, with the NFC-B listen mode devices Di through an antenna 12.

The main processor 10 is in particular responsible for managing the NFC controller 11.

The NFC controller 11 is configured to identify (discover) a plurality of NFC-B listen mode devices D1-Dp during more than one collision resolution cycles, also called thereafter discovery cycles.

Figure 3:
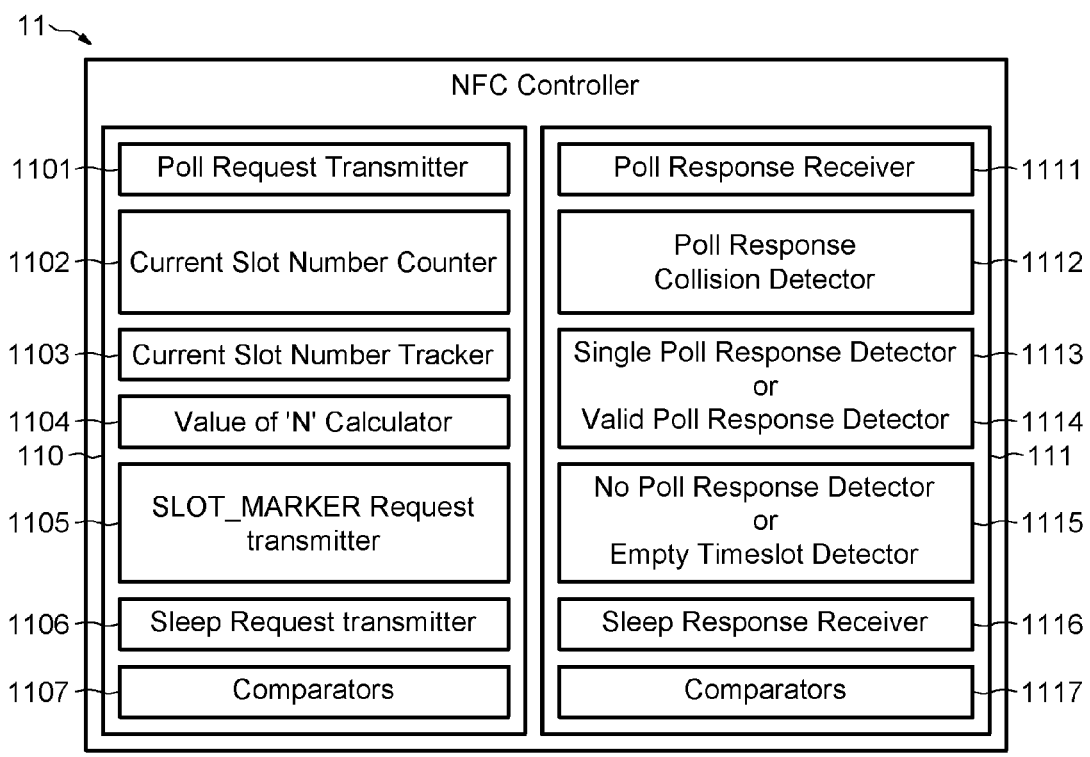

As illustrated diagrammatically in FIG. 3, the NFC controller 11 includes a transmitting block 110 and a receiving block 111.

As it will be explained more in details thereafter, the transmitting block is configured to transmit, at the beginning of each discovery cycle, a first command (called SENSB_REQ in the NFC Digital and Activity Specifications) including a number of time slots which is lower than or equal to a maximum number. This maximum number is typically equal to $2^{(N-1)}$ with N=5. The maximum number is thus equal to 16.

With this respect, and as diagrammatically illustrated in FIG. 3, the transmitting block 110 comprises a poll request transmitter 1101, a current slot number counter 1102, a current slot number tracker 1103, a calculator 1104 configured to calculate the value of the number N, a transmitter 1105 configured to transmit a request called SLOT_MARKER command, a transmitter 1106 configured to send a second command which is a sleep request, intended to put a NFC-B listen mode device in a SLEEP state and comparators 1107.

Although some of these sub-blocks have been represented separately, for example the transmitters, they may be implemented for example by a unique software module adapted to selectively transmit the different requests or commands.

The receiving block 111 is configured to detect the presence or the absence of any response, such as a SENSB_RES response, during a time slot and to analyze such response to check if this response is valid or not.

With this respect, the receiving block includes as illustrated diagrammatically in FIG. 3, a poll response receiver 1111, a poll response collision detector 1112, a single poll response or valid poll response detector 1113 and an empty time slot or no poll response detector 1114, a sleep response receiver 1115 and comparators 1116.

Again, although some sub-blocks, for example the receivers and the detectors have been represented separately, they may be implemented in one or more software modules adapted to analyze the several responses.

Figure 4A:
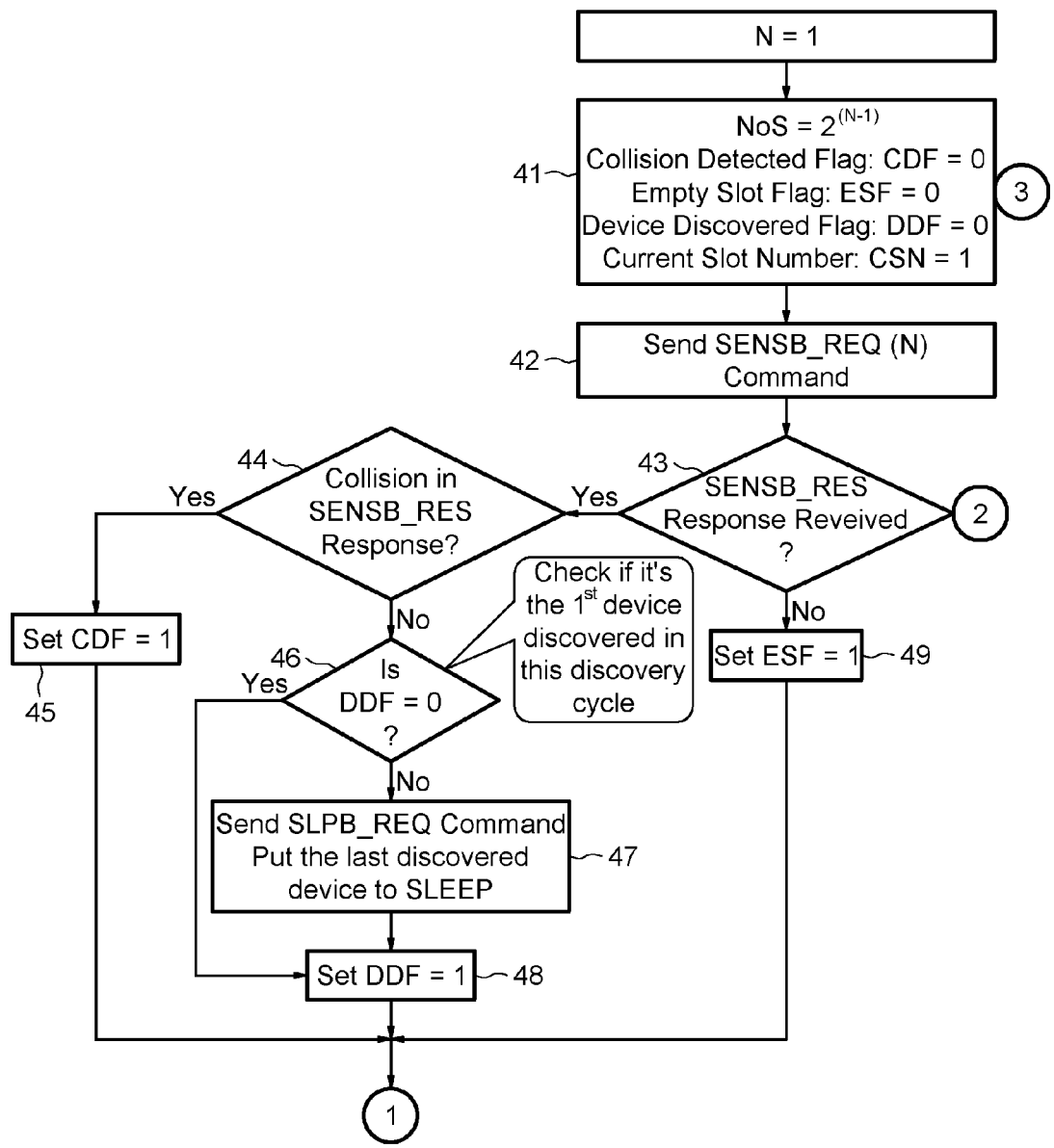
Figure 4B:
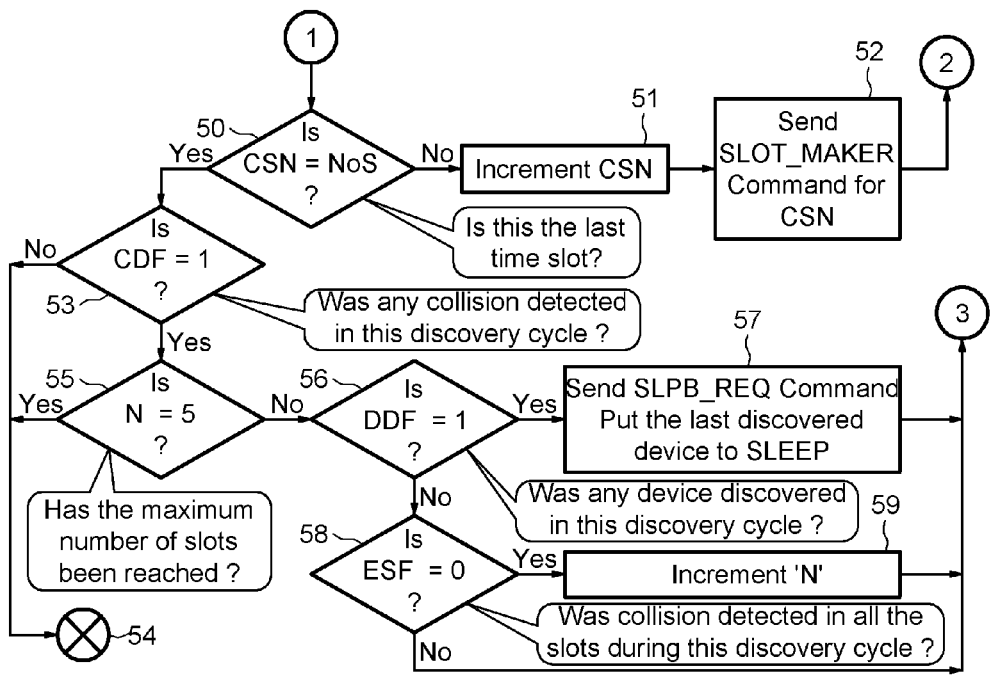

Reference is now made in particular to FIGS. 4a and 4b which disclose a flow chart of an embodiment of a method for identifying (discovering) a plurality of NFC-B listen mode devices by a NFC-poll mode device during more than one discovery cycles.

Each discovery cycle starts with a first command called here SENSB_REQ command, sent by the NFC-B poll mode device and including a number NoS of time slots. The number NoS is equal to $2^{(N-1)}$ where N can vary from 1 to 5. Accordingly, the number of time slots can vary from 1 to $2^{(N-1)}$, where $2^{(5-1)}=16$ is the maximum number of time slots within a discovery cycle.

Generally speaking, if NoS is '1', then all the NFC-B listen mode devices present in the RF field transmit their SENSB_RES response in the sole time slot. However, if NoS is greater than '1', then each NFC-B listen mode device randomly selects a time slot in which it transmits its SENSB_RES response.

When more than one SENSB_RES responses are transmitted in the same time slot, then the NFC reader detects collision (i.e., it will receive an invalid SENSB_RES response) which indicates the presence of more than one NFC-B listen mode devices in the RF field.

The NFC reader uses the following flags which are set to '0' at the beginning step 41 of every discovery cycle:

Collision Detected Flag (CDF): CDF is set to '1' when a collision is detected in a time slot. i.e., more than one NFC-B listen mode devices have transmitted their SENSB_RES response in the same time slot.

Empty Slot Flag (ESF): ESF is set to '1' when no SENSB_RES response is received in a time slot. i.e., corresponding to an empty time slot.

Device Detected Flag (DDF): DDF is set to '1' when a valid SENBS_RES response is received in a time slot. i.e., only one NFC-B listen mode device has transmitted the SENSB_RES response in a time slot. This is the case when a NFC-B listen mode device is discovered.

A CSN Counter is used to track the Current Slot Number. CSN Counter is set to '1' at the beginning of every discovery cycle.

It could be noted here that instead of using the DDF flag, another counter, called device discover counter DDC, may be used to track the number of NFC-B listen mode devices discovered in a discovery cycle. DDC is incremented for every discovered NFC-B listen mode device. DDC is set to '0' at the beginning step 41 of every discovery cycle.

After the transmitting block of the NFC controller has sent the first command SENSB_REQ including the number $2^{(N-1)}$ of time slots for the current discovery cycle (step 42), the receiving block of the NFC controller checks whether any response is received, typically if any SENSB_RES response is received (step 43) in the current time slot.

The detectors of the receiving block 111 check in step 44 whether the received SENSB_RES response is a valid response or if this response is an invalid response corresponding to a collision between two NFC-B listen mode devices.

If a collision is detected, the flag CDF is set to 1 (step 45).

If no collision is detected, i.e., if the response is a valid SENSB_RES response, the transmitting block 110 of the NFC controller checks the value of the flag DDF. In other words, the transmitting block of the NFC controller checks here in step 46 if it is the first device discovered in this current discovery cycle.

If yes, i.e., if the flag DDF is equal to 0, the flag DDF is set to 1 (step 48) and the transmitting block does not send a second command (SLPB_REQ command) to put the last discovered device to a SLEEP state.

By contrast, if in step 46, the flag DDF is already equal to 1, i.e., if the device discovered in this discovery cycle is not the first discovered device, the transmitting block of the NFC controller sends in step 47, the second command (SLPB_REQ command) to put the last discovered device to the SLEEP state.

If in step 43 no response is received, the flag ESF is set to 1 in step 49 meaning that the current time slot is an empty time slot.

Once the time elapses for a time slot (irrespective of whether valid SENSB_RES response(s), invalid SENSB_RES response(s) and/or no SENSB_RES response was/were received), the NFC reader compares the value of CSN Counter with the Number of Time slot (NoS).

In other words, the transmitting block of the NFC controller checks in step 50 the value of the counter CSN to check whether this current time slot is the last time slot.

If the current time slot is not the last time slot (i.e., if the value of the counter CSN is not equal to NoS), the counter CSN is incremented (step 51) and the SLOT_MARKER command associated to this value of the CSN counter is sent (step 52).

Step 43 is thus again executed.

If the current time slot is actually the last time slot, thus step 53 is executed wherein the NFC controller checks the value of the flag CDF. In other words, the NFC controller checks if any collision is detected in this current discovery cycle.

If no collision was detected (CDF=0) thus the discovery method is stopped (point 54).

If at least one collision was detected in this current discovery cycle, the NFC controller checks in step 55 whether the maximum number of slots has been reached.

In other words, the value of N is compared with the maximum value (i.e., 5).

If the maximum number of slots has been reached, the discovery method is stopped (point 54).

In other words, if the value of CSN Counter is not equal to the number of time slots (NoS), then the NFC reader increments the value of CSN Counter and then transmits the SLOT_MARKER Command for that value of CSN counter.

If the value of CSN Counter is equal to the number of time slots (NoS), then the NFC reader starts another discovery cycle if and only if:
CDF is set to '1'
AND
Value of 'N' is not equal to '5'.

Otherwise, if the conditions in both (i) and (ii) are not TRUE, then the NFC reader will exit (or successfully conclude) the discovery method.

When the NFC reader is to start another discovery cycle, it checks the value of DDF flag (step 56) and the value of ESF flag (step 58). And it will increment (step 59) the value of 'N' for the subsequent SENSB_REQ Command if and only if:
DDF is set to '0'
AND
ESF is set to '0'.

Otherwise, if the conditions in both (iii) and (iv) are not TRUE, then the NFC reader will not change the value of 'N' for the subsequent SENSB_REQ Command.

And when the NFC reader is to start another discovery cycle, it will transmit the SLPB_REQ Command (step 57) to the last discovered NFC-B listen mode device if and only if:
DDF is set to '1'.

Otherwise, if this condition is not TRUE, then the NFC reader will move to the next step 58.

The NFC reader repeats from the first step 41 again.

Reference is now made to FIG. 5 for illustrating an example of a discovery method for four NFC-B listen mode devices D1-D4 assumed to be present in the RF field.

In this figure, the symbol x means a collision in SENSB_RES response of those devices for the corresponding time slot. In other words, more than '1' SENSB_RES responses are received in this corresponding time slot.

The symbol ✓ means no collision in SENSB_RES response for the corresponding time slot. In other words, only '1' SENSB_RES response is received from one device in this corresponding time slot.

The symbol + means an empty time slot for the corresponding time slot. No SENSB_RES response is received in this corresponding time slot.

In the discovery cycle 1, the first command SENSB_REQ is sent specifying a number of time slots NoS equal to 1.

All the devices transmit their SENSB_RES response in the sole time slot, hence resulting in collision. No device is discovered.

Consequently, N is incremented to 2, leading to NoS=2.

The corresponding first command SENSB_REQ is sent for the discovery cycle number 2. During this cycle, collision is assumed to be detected within time slots 1 and 2 and accordingly, no device is discovered.

Because no device was discovered and collision was detected, N is incremented to 3, leading to NoS=4.

During the discovery cycle no 3, the NFC-B listen mode device D1 is assumed to be identified (discovered) in time slot no 1 whereas the NFC-B listen mode device D2 is assumed to be identified in time slot no 2.

Thus, during this time slot no 2, the SLPB_REQ command is sent to device D1 to put this device in a sleep state. A collision is detected in time slot 3 whereas time slot 4 is empty. Because time slot 4 is the last time slot, the SLPB_REQ command is sent for device D2 to put it in a sleep state.

And, there is no change in the value of N because at least one device was discovered during this discovery cycle no 3.

During discovery cycle no 4, time slots 1, 3 and 4 are assumed to be empty while a collision is detected within time slot 2.

Accordingly, during this discovery cycle, a collision was detected, no device was discovered and an empty time slot was detected.

And, because there was at least one empty time slot, there is again no change in the value of N.

At last, during the discovery cycle no 5, which is here the last discovery cycle, time slots 1 and 4 are empty while devices D3 and D4 are assumed to be detected during time slots 2 and 3.

Accordingly, the SLPB_REQ command for device D3 is sent during time slot 3 while the last discovered device D4 remains in active state and is not put to sleep state.

It can be seen that the NFC Forum Specification is not violated while the number of time slots has been optimized with the last discovered device detected in the last discovery cycle remaining in active state.

Figure 6:
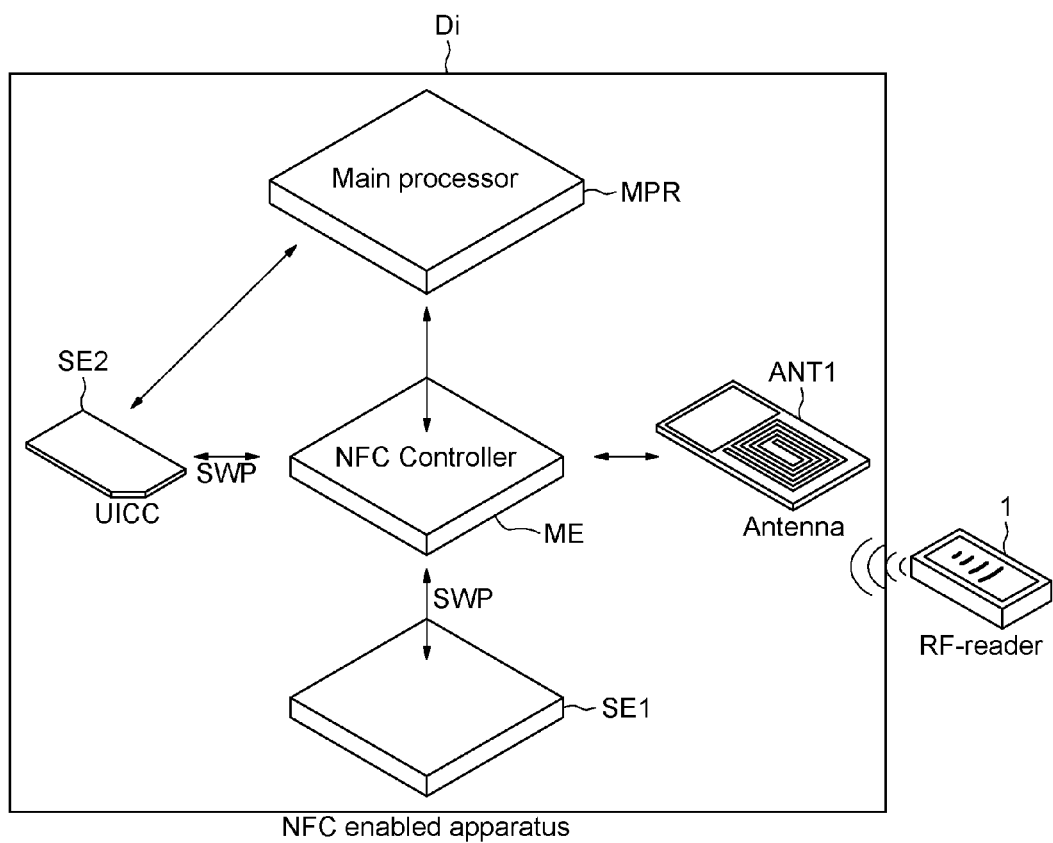

While in FIG. 1, each NFC-B listen mode device may be a card or a tag, such NFC-B listen device Di may be a NFC enabled apparatus as illustrated in FIG. 6, for example a NFC-enabled mobile phone.

More precisely, the mobile phone Di comprises a NFC controller ME which is responsible for wireless communication with external RF reader 1 through an antenna ANT1.

The mobile phone 1 may comprise also two auxiliary secure elements SE1 and SE2 connected to the NFC controller ME.

A secure element is for example an element adapted to contain secure or protected information, for example banking information, information related to telephone subscription . . . .

The secure element SE1 may be an embedded secure element, for example totally embedded in an integrated circuit containing the NFC controller, and for example packed with the NFC controller.

The secure element SE1 hosts for example some particular ISO/IEC 14443-4 compliant RF applications running in card emulation mode, for example banking or transport applications.

The second auxiliary element SE2 is here a removable secure element, for example a UICC providing the network subscription (SIM and USIM application) and some RF applications using the ISO/IEC 14443-4 protocol layer in card emulation mode.

The mobile phone Di comprises also a main processor MPR responsible for managing the UICC and NFC controller as well for user input and network communication.

Figure 7:
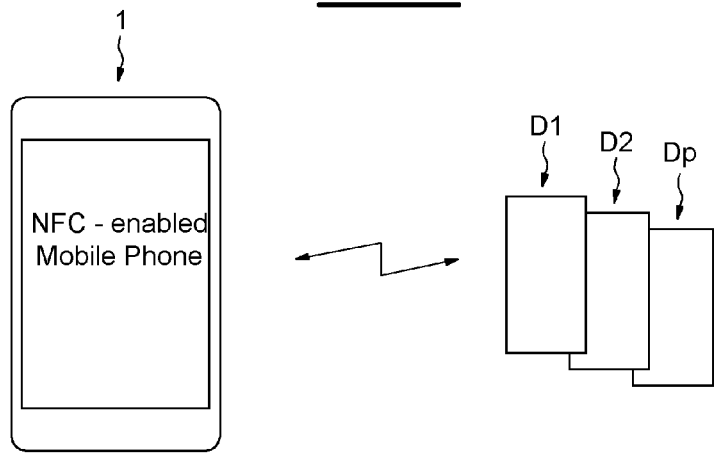

At last, as illustrated in FIG. 7, the NFC-poll mode device 1 may be a NFC-enabled mobile phone configured to communicate with the NFC-B listen mode devices D1-Dp.

What is claimed is:

1. A method for identifying a plurality of Near Field Communication-type B devices operating in a listen mode (NFC-B listen mode devices) by a Near Field Communication-type B device operating in a poll mode (NFC-B poll mode device) during more than one collision resolution cycles, each collision resolution cycle starting with a first command sent by the NFC-B poll mode device and including a number of time slots less than or equal to a maximum number, a first collision resolution cycle including one time slot, the method comprising:
   when the NFC-B poll mode device is to start another collision resolution cycle after a current collision resolution cycle is ended, increasing, by the NFC-B poll mode device, the number of time slots with respect to the number of time slots of the ended current collision resolution cycle if and only if no NFC-B listen mode device has been identified during the ended current collision resolution cycle and no empty time slot has been detected during the ended current collision resolution cycle; and
   when a NFC-B listen mode device is identified within a time slot of a current collision resolution cycle, sending, by the NFC-B poll mode device to the identified NFC-B listen mode device, a second command for putting the identified NFC-B listen mode device in a sleep state, the second command being sent within a subsequent time slot of the current collision resolution cycle except for the NFC-B listen mode device lastly identified within the last collision resolution cycle.

2. The method according to claim 1, wherein within a collision resolution cycle, the NFC-B poll mode device sends the second command to the identified NFC-B listen mode device during the next time slot within which another NFC-B listen mode device is identified or within the last time slot except if the collision resolution cycle is the last collision resolution cycle.

3. The method according to claim 2, wherein a collision resolution cycle is the last collision resolution cycle when no collision between at least two NFC-B listen mode devices has been detected in all the time slots of the collision resolution cycle or when the number of time slots of the collision resolution cycle is equal to the maximum number.

4. The method according to claim 1, wherein a collision resolution cycle is the last collision resolution cycle when no collision between at least two NFC-B listen mode devices has been detected in all the time slots of the collision resolution cycle or when the number of time slots of the collision resolution cycle is equal to the maximum number.

5. The method according to claim 4, wherein the collision resolution cycle is the last collision resolution cycle when no collision between at least two NFC-B listen mode devices has been detected in all the time slots of the collision resolution cycle.

6. The method according to claim 4, wherein a collision resolution cycle is the last collision resolution cycle when the number of time slots of the collision resolution cycle is equal to the maximum number.

7. A near Field Communication-type B device configured to operate in a poll mode (NFC-B poll mode device), comprising:
   an NFC controller configured to identify a plurality of Near Field Communication-type B operating in a listen mode (NFC-B listen mode devices) during more than one collision resolution cycles;
   wherein the NFC controller includes a transmitting block configured to transmit, at the beginning of each collision resolution cycle, a first command including a number of time slots lower than or equal to a maximum number, the first collision resolution cycle including one time slot;
   wherein the NFC controller also includes a receiving block configured to detect the presence or the absence of any response during a time slot and to analyze such response;
   wherein when the transmitting block is to send another first command for starting another collision resolution cycle after a current collision resolution cycle is ended, the transmitting block is configured to increase the number of time slots with respect to the number of time slots of the ended current collision resolution cycle if and only if the receiving block has received no response representative of an identified NFC-B listen mode device during the ended current collision resolution cycle and has detected no empty time slot during the ended current collision resolution cycle; and
   wherein when the receiving block has detected a response representative of a identified NFC-B listen mode device within a time slot of a current collision resolution cycle, the transmitting block is configured to send to the identified NFC-B listen mode device a second command for putting the identified NFC-B listen mode device in a sleep state, the second command being sent, within a subsequent time slot of the current collision resolution cycle except for the NFC-B listen mode device lastly identified within the last collision resolution cycle.

8. The NFC-B poll mode device according to claim 7, wherein the transmitting block is configured to send, within a collision resolution cycle, the second command to the identified NFC-B listen mode device during the next time slot within which another NFC-B listen mode device is identified or within the last time slot except if the collision resolution cycle is the last collision resolution cycle.

9. NFC-B poll mode device according to claim 8, wherein the transmitting block is configured to consider a collision resolution cycle as the last collision resolution cycle when the receiving block does not receive any response representative of a collision between at least two NFC-B listen mode devices in all the time slots of the collision resolution cycle or when the number of time slots of the collision resolution cycle is equal to the maximum number.

10. The NFC-B poll mode device according to claim 7, wherein the transmitting block is configured to consider a collision resolution cycle as the last collision resolution cycle when the receiving block does not receive any response representative of a collision between at least two NFC-B listen mode devices in all the time slots of the collision resolution cycle or when the number of time slots of the collision resolution cycle is equal to the maximum number.

11. The NFC-B poll mode device according to claim 10, wherein the transmitting block is configured to consider the collision resolution cycle as the last collision resolution cycle when the receiving block does not receive any response representative of a collision between at least two NFC-B listen mode devices in all the time slots of the collision resolution cycle.

12. The NFC-B poll mode device according to claim 10, wherein the transmitting block is configured to consider a collision resolution cycle as the last collision resolution cycle when the number of time slots of the collision resolution cycle is equal to the maximum number.

13. The NFC-B poll mode device according to claim 7, wherein the NFC-B poll device is an NFC-enabled reader device.

14. The NFC-B poll mode device according to claim 13, wherein the NFC-enable reader device is a NFC-enabled mobile phone.

15. A near Field Communication-type B device configured to operate in a poll mode (NFC-B poll mode device), comprising:
an antenna;
an NFC controller configured to control wireless communication through the antenna; and
a processor, configured to manage the NFC controller so that during operation the NFC controller performs a procedure to identify a plurality of Near Field Communication-type B devices operating in a listen mode (NFC-B listen mode devices) during more than one collision resolution cycles, each collision resolution cycle starting with a first command sent by the NFC-B poll mode device and including a number of time slots less than or equal to a maximum number, a first collision resolution cycle including one time slot, the procedure comprising:

when the NFC-B poll mode device is to start another collision resolution cycle after a current collision resolution cycle is ended, increasing, by the NFC-B poll mode device, the number of time slots with respect to the number of time slots of the ended current collision resolution cycle if and only if no NFC-B listen mode device has been identified during the ended current collision resolution cycle and no empty time slot has been detected during the ended current collision resolution cycle; and when a NFC-B listen mode device is identified within a time slot of a current collision resolution cycle, sending, by the NFC-B poll mode device to the identified NFC-B listen mode device, a second command for putting the identified NFC-B listen mode device in a sleep state, the second command being sent within a subsequent time slot of the current collision resolution cycle except for the NFC-B listen mode device lastly identified within the last collision resolution cycle.

16. The NFC-B poll mode device according to claim 15, wherein the NFC controller is configured to send, within a collision resolution cycle, the second command to the identified NFC-B listen mode device during the next time slot within which another NFC-B listen mode device is identified or within the last time slot except if the collision resolution cycle is the last collision resolution cycle.

17. NFC-B poll mode device according to claim 15, wherein the NFC controller is configured to consider a collision resolution cycle as the last collision resolution cycle when the NFC controller does not receive any response representative of a collision between at least two NFC-B listen mode devices in all the time slots of the collision resolution cycle or when the number of time slots of the collision resolution cycle is equal to the maximum number.

18. The NFC-B poll mode device according to claim 15, wherein the NFC-B poll device is an NFC-enabled reader device.

19. The NFC-B poll mode device according to claim 18, wherein the NFC-enable reader device is a NFC-enabled mobile phone.

* * * * *